Patented Jan. 23, 1945 2,368,073

UNITED STATES PATENT OFFICE 2,368,073

PROCESS FOR PREPARING HYDROXY AMIDES

Philip F. Tryon, Terre Haute, Ind., assignor to Commercial Solvents Corporation, Terre Haute, Ind., a corporation of Maryland No Drawing. Application April 12, 1943, Serial No. 482,759

3 Claims. (Cl. 260—561)

This invention relates to the preparation of hydroxy aliphatic amides, and particularly to the preparation of these compounds by the reduction of beta nitro carboxylic esters, and subsequent rearrangement of the resultant beta amino ester to the amide.

In my copending application, U. S. Serial No. 482,761, filed April 12, 1943, I have described a method of preparing acylated hydroxy amides by the treatment of 2-oxazolines with acid anhydrides.

I have now found that hydroxy amides may be prepared from beta nitro carboxylic esters by a process which involves reduction of the nitro compound to the corresponding amine, and rearrangement of the amine to the corresponding amide under conditions which insure a high yield of amide and prevent the concomitant condensation to the 2-oxazoline compound.

The reactions according to my invention probably proceed somewhat as follows:

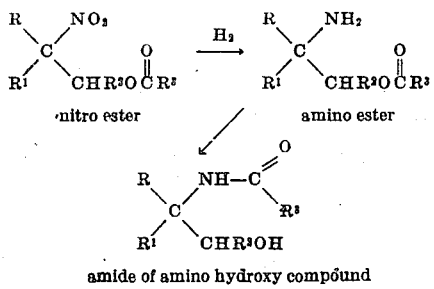

amide of amino hydroxy compound where R and $R^1$ represent hydrogen, aryl, alkyl, acyloxyalkyl, or hydroxyacyloxyalkyl, $R^2$ represents hydrogen, alkyl, aryl or heterocyclic, $R^3$ represents hydrogen, alkyl, aryl, or hydroxy alkyl.

Among the amides which may be prepared according to my invention, the following may be mentioned: 2-lactamido-2-methyl-1-propanol, 2-benzamido-2-methyl-1-propanol, 2-acetamido-2-methyl-1-propanol, 2-stearamido-2-methyl-1-propanol, 2-acetamido-1-butanol, 3-acetamido-2-butanol, 2-acetamido-2-methyl-1,3-propanediol mono-acetate, 2-lauramindo-2-methyl-1,3-propanediol monolaurate, 2-acetamido-2-hydroxymethyl-1,3-propanediol diacetate, 2-acetamido-1-phenylpropanol, 2-acetamido-1-(2-furyl)-propanol, 2-lauramido-2-phenyl-1-butanol, and 2-acetamido-2-phenyl-1-butanol.

In carrying out my invention, the desired beta nitro ester is converted to the corresponding amino compound by direct hydrogenation. This is accomplished by first dispersing the beta nitro ester in a suitable inert solvent such as methanol in the presence of Raney nickel catalyst and thereafter bringing hydrogen into contact with the nitro ester at a temperature between about 30 and 50° C., under pressures from about 500 to 2000 lbs.

After the reaction is complete, the catalyst is removed by filtration, and the inert liquid is removed by distillation. To obtain the hydroxy amide, it is convenient to first add a water immiscible liquid such as benzene to permit the removal of any water formed as a separate liquid layer, and then to recover the liquid or solid amide by distillation or evaporation of the benzene.

I have found that the temperature of distillation is an important factor in controlling the course of the reaction, as it is during this step that rearrangement of the amine to the amide and condensation to the oxazoline takes place. To obtain the hydroxy amides of the present invention as the final end product of the reaction, and to isolate it as such, care must be taken to maintain the distillation temperature reasonably low, for example, not appreciably above about 100° C. liquid temperature, and preferably to use reduced pressures of about 1 mm. and a vapor temperature of about 100° C. in cases where the amide itself can be distilled.

If the temperature rises appreciably above the 100° C. liquid temperature figure, the amide will begin to condense into the corresponding oxazoline, as described in my copending application U. S. Serial No. 482,760, filed April 12, 1943, the nature of the subsequent reaction depending on whether the condensation splits off water or an acid. If the temperature rises still higher, for example, above about 150° C. liquid temperature, substantially all of the product will go the oxazoline compound as described in copending application U. S. Serial No. 482,758, filed April 12, 1943, and very little hydroxy amide will be recovered.

An illustrative example of my invention is given below.

Example

One hundred sixty-one grams of 2-nitroisobutyl acetate was placed in a reaction vessel together with 650 milliliters of methanol and 10 grams of Raney nickel catalyst and thereafter subjected to hydrogenation at 35° C., and 1200 lbs. pressure for six hours. The catalyst was then removed by filtration and the methanol was removed by distillation. Benzene was then added to the distillation system and 30 milliliters of water was removed through a separator. Distillation was continued under careful temperature control, maintaining the vapor temperature between 93 and 95° C., at 1 mm. pressure, whereupon 47 grams of the amide, 2-acetamido-2-methyl-1-propanol was obtained.

Among the nitro esters which may be used in practicing my invention are all of those encompassed by the generic formula set out above, including the following: 2-nitro-2-methyl-1-propyl acetate, 2-nitroisobutyl lactate, 2-nitroisobutyl benzoate, 2-nitroisobutyl acetate, 2-nitroisobutyl stearate, 2-nitrobutyl acetate, 3-nitro-2-butyl acetate, 2-nitro-2-methyl-1,3-propanediol diacetate, 2-nitro-2-methyl-1,3-propanediol dilaurate, tris(acetoxy-methyl)nitromethane, 2-nitro-1-phenylpropyl acetate, and 2-nitro-1-(2-furyl)propyl acetate.

While the above description sets forth the preferred embodiments of the invention, it is to be understood that departures may be made therein within the scope of the invention as described and claimed.

What is claimed is:

1. In a process for the preparation of hydroxy amides of the formula:

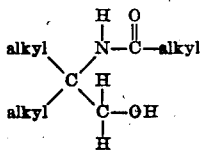

the step which comprises subjecting an amino compound of the formula:

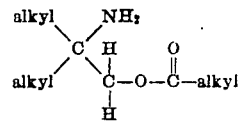

to a temperature not in substantial excess of 100° C., to cause rearrangement of the amino ester to the corresponding amide.

2. In a process for the preparation of hydroxy amides of the formula:

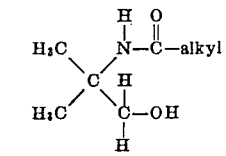

the step which comprises subjecting an amino compound of the formula:

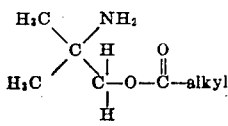

to a temperature not in substantial excess of 100° C., to cause rearrangement of the amino ester to the corresponding amide.

3. In a process for the preparation of 2-acetamido-2-methyl-1-propanol from 2-aminoisobutyl acetate, the step which comprises subjecting 2-aminoisobutyl acetate to distillation under reduced pressure at a temperature of about 93–95° C., to convert the said amino compound into the corresponding amide.

PHILIP F. TRYON.